US011875102B2

(12) United States Patent
Deleuze et al.

(10) Patent No.: US 11,875,102 B2
(45) Date of Patent: Jan. 16, 2024

(54) AUTOMATIC FONT SELECTION

(71) Applicant: International Business Machines Corporation, Armonk, NY (US)

(72) Inventors: Ivan Deleuze, Montpellier (FR); Guilhaume Garcia, Le Cres (FR)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/791,060

(22) Filed: Feb. 14, 2020

(65) Prior Publication Data
US 2021/0256196 A1    Aug. 19, 2021

(51) Int. Cl.
*G06F 40/109*    (2020.01)
*G06F 40/166*    (2020.01)

(52) U.S. Cl.
CPC .......... *G06F 40/109* (2020.01); *G06F 40/166* (2020.01)

(58) Field of Classification Search
CPC ..... G06F 40/103; G06F 40/109; G06F 40/166
See application file for complete search history.

(56) References Cited

U.S. PATENT DOCUMENTS

| | | | | |
|---|---|---|---|---|
| 5,652,851 A | * | 7/1997 | Stone | G06T 11/00 345/440.1 |
| 6,675,357 B1 | * | 1/2004 | Carter | G06F 3/1208 715/269 |
| 7,337,392 B2 | * | 2/2008 | Lue | G06F 16/9577 715/236 |
| 7,650,594 B2 | | 1/2010 | Nattinger | |
| 8,078,965 B2 | | 12/2011 | Wang-Aryattanwanich et al. | |
| 9,547,628 B2 | * | 1/2017 | Mangalam | G06F 40/109 |
| 2001/0021937 A1 | | 9/2001 | Cicchitelli et al. | |
| 2004/0189610 A1 | | 9/2004 | Friend | |
| 2007/0300153 A1 | * | 12/2007 | Newman | H04L 51/216 715/277 |
| 2011/0276872 A1 | * | 11/2011 | Kataria | G06F 40/109 715/764 |
| 2014/0222662 A1 | * | 8/2014 | Bierwas | G06Q 20/10 705/39 |
| 2014/0365881 A1 | * | 12/2014 | Suarez | G06F 40/109 715/269 |

(Continued)

FOREIGN PATENT DOCUMENTS

EP    0583548 A1    2/1994

OTHER PUBLICATIONS

Softwareengineering.stackexchange.com "Simple method for reliably detecting code in text?" Jun. 28, 2011, pp. 1-10 https://web.archive.org/web/20161224213057/https://softwareengineering.stackexchange.com/questions/87611/simple-method-for-reliably-detecting-code-in-text (Year: 2011).*

(Continued)

*Primary Examiner* — Scott T Baderman
*Assistant Examiner* — Mario M Velez-Lopez
(74) *Attorney, Agent, or Firm* — Rachel M. Yadlosky

(57) ABSTRACT

A method can include obtaining a text composition having a first font. The method can further include generating a category identifier that indicates a category of the text composition. The method can further include selecting, in response to generating the category identifier and based on the category identifier, a second font for the text composition. The method can further include initiating, in response to selecting the second font, a display of the text composition in the second font.

18 Claims, 7 Drawing Sheets

(56) References Cited

U.S. PATENT DOCUMENTS

| | | |
|---|---|---|
| 2017/0116412 A1* | 4/2017 | Stopel .................... G06F 21/577 |
| 2018/0285965 A1* | 10/2018 | Kaasila .............. G06Q 30/0643 |
| 2019/0108203 A1 | 4/2019 | Wang et al. |
| 2019/0213249 A1* | 7/2019 | Kistler .................. G06F 40/166 |
| 2019/0325277 A1 | 10/2019 | Jin et al. |
| 2019/0347323 A1 | 11/2019 | Riesa et al. |
| 2020/0004297 A1* | 1/2020 | Rekapalli .............. G06F 1/1618 |
| 2020/0175093 A1* | 6/2020 | Johnson ................ G06F 40/109 |
| 2021/0103632 A1* | 4/2021 | Kadia .................... G06V 10/82 |

OTHER PUBLICATIONS

Mell et al., "The NIST Definition of Cloud Computing", Recommendations of the National Institute of Standards and Technology, Sep. 2011, 7 pages.

* cited by examiner

AUTOMATIC FONT SELECTION

BACKGROUND

The present disclosure relates to displayed text, and more specifically, to automatic font selection for displayed text.

Text can be electronically displayed in a plurality of fonts. Applications, such as word processing applications, can permit a user to select and/or modify a font according to the user's preference.

SUMMARY

According to embodiments of the present disclosure, a method can include obtaining a text composition having a first font. The method can further include generating a category identifier. The category identifier can indicate a category of the text composition. The method can further include selecting, in response to the generating the category identifier and based on the category identifier, a second font for the text composition. The method can further include initiating, in response to the selecting the second font, a display of the text composition in the second font.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
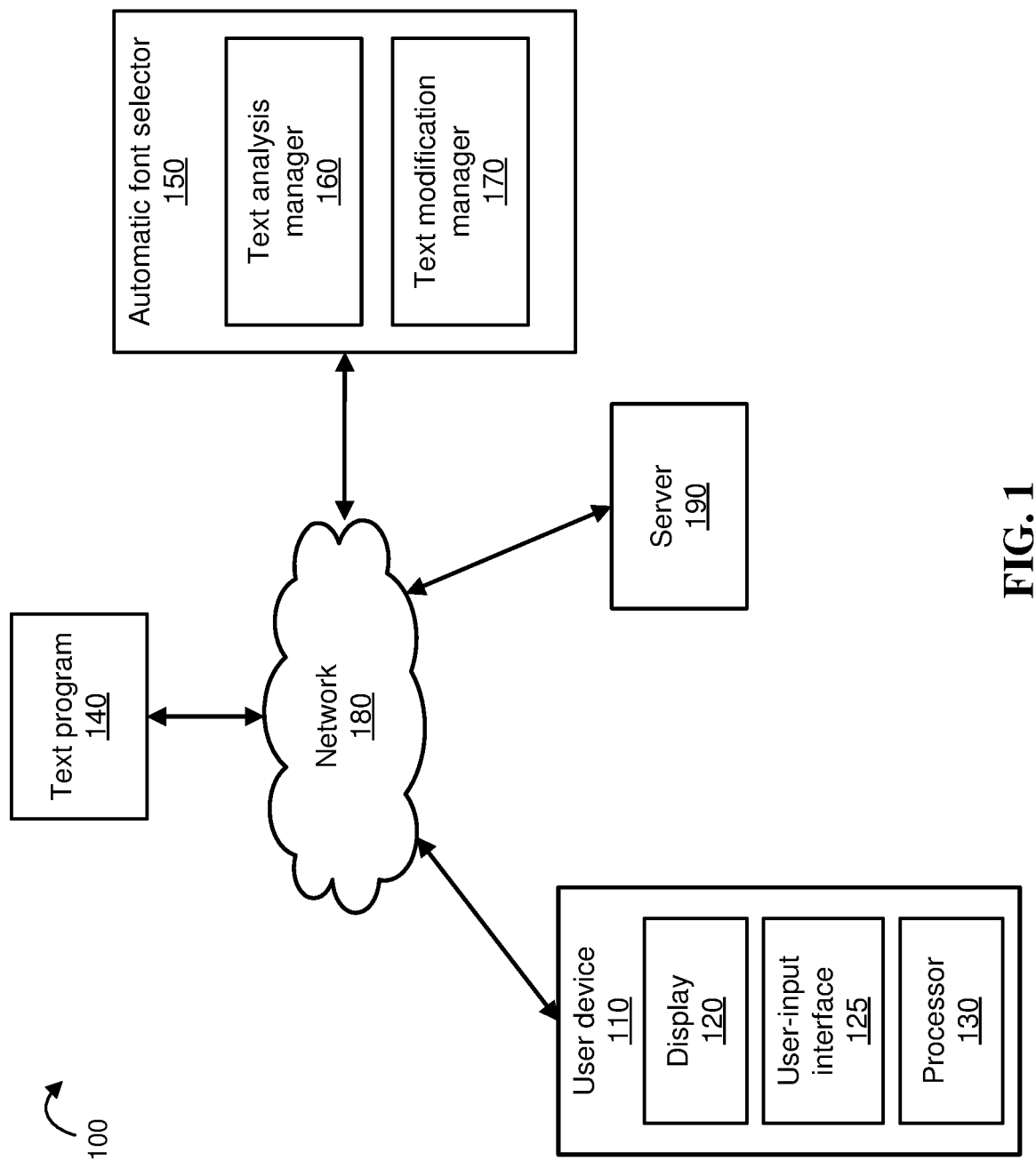
FIG. 1 depicts an example computing environment having an automatic font selector, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to displayed text; more particular aspects relate to automatic font selection for displayed text. While the present disclosure is not necessarily limited to such applications, various aspects of the disclosure may be appreciated through a discussion of various examples using this context.

Text can be electronically displayed in a plurality of fonts. Applications, such as word processing applications, can permit a user to select and/or modify a font according to the user's preference. Text can be displayed in fonts such as monospaced fonts and proportional fonts. A monospaced font is a type of font in which each character of the font has the same width (e.g., each character of the font occupies an equivalent amount of horizontal space on a line of text). A proportional font is a type of font in which each character of the font can have a different width.

Although proportional fonts can be commonly found in publications, such as books, newspapers, magazines, and websites, monospaced fonts can be preferred in some areas. For example, in programming and code development, a monospaced font can be preferred because it can provide a consistent alignment between lines of text. Such consistent alignment can provide clearer formatting and readability of displayed lines of code, compared to the formatting and readability provided by proportional fonts. The consistent alignment of monospaced fonts can also be beneficial in managing and monitoring network activity, which can include recording large quantities of event logs with corresponding dates and times. These event logs can include multiple lines of text having a format that can be more easily and more efficiently interpreted in a monospaced font than in a proportional font.

In some instances, users such as programmers, code developers, and network managers perform tasks that include routinely transitioning between drafting lines of code, drafting documents, and/or drafting messages, such as collaborative chat messages in a messaging application. In these instances, the user can employ a different text program (e.g., text editor, word processor, and/or messaging application) to complete each task. Furthermore, the tasks can include electronically cutting and pasting and/or electronically copying and pasting different types of text between different text programs. In the present disclosure, electronically cutting text can refer to electronically selecting text within a text program (e.g., highlighting text with a cursor) and issuing a command to remove the selected text from a first location so that it can be electronically pasted, or inserted, into a second location. Electronically copying text can refer to selecting text within a text program and issuing a command to create a duplicate of the selected text; the duplicate can be electronically pasted into a second location. Electronically pasting text can refer to issuing a command to electronically insert text into a location within a text program.

For example, in some instances, a first code developer can use a text editor to draft code and use a messaging application to collaborate with a second code developer. In this example, the first code developer may wish to use the messaging application to share several lines of code from the text editor. To accomplish this, the first code developer can electronically copy the lines of code from the text editor and electronically paste the lines of code into the messaging application. In some instances, the lines of code can be displayed in a monospaced font in the text editor, but can be displayed in a proportional font when they are electronically pasted into the messaging application. The change in font may be undesired by the first code developer. Furthermore, manually adjusting the font of the electronically pasted lines of code can be cumbersome and inefficient.

To address these and other challenges, embodiments of the present disclosure include an automatic font selector. The automatic font selector can automatically select a font of a text composition based on the content of the text composition. The automatic font selector can initiate the font selection when the text composition is transferred (e.g., electronically copied and pasted). Particularly, embodiments of the present disclosure can obtain a text composition, generate a category identifier that indicates a category of the text composition, select a second font for the text composition based on the category identifier, and initiate a display of the text composition in the second font. Accordingly, embodiments of the present disclosure can improve the formatting and readability of a text composition, as well as improve the efficiency of adjusting fonts according to a category of text.

Turning to the figures, FIG. 1 illustrates a computing environment 100 that includes one or more of each of a text program 140, a user device 110, a server 190, an automatic font selector 150, and a network 180. In some embodiments, at least one text program 140, user device 110, server 190, and automatic font selector 150 can exchange data with at least one other through the at least one network 180. One or more of each of the text program 140, user device 110, server 190, automatic font selector 150, and network 180 can include a computer system, such as the computer system 501 discussed with respect to FIG. 5.

In some embodiments, an automatic font selector 150 can be integrated into one or more text programs 140. For example, some embodiments of the present disclosure can include three discrete text programs 140: a word processor, a text editor, and a messaging application. In this example, an automatic font selector 150 can be integrated into one or more of the three discrete text programs 140. For example, one or more of the three discrete text programs 140 can include an automatic font selector 150 as a plug-in software component that can be implemented by a processor, such as the processor 130 or a processor of the server 190.

In some embodiments, a text program 140 and an automatic font selector 150 can be discrete software applications installed on a computer system of one or more of a user device 110 and a server 190. For example, in some embodiments, an automatic font selector 150 can be installed on a computer system of user device 110 and implemented by processor 130, while text program 140 can be installed on a computer system of server 190. In another example, an automatic font selector 150 and a text program 140 can be installed on a computer system of a user device 110 as discrete software applications. Further in this example, each of the automatic font selector 150 and the text program 140 can be implemented by processor 130.

In some embodiments, the automatic font selector 150 can include a text analysis manager 160 and a text modification manager 170. The automatic font selector 150 can include program instructions implemented by a processor, such as processor 130, to perform one or more operations discussed with respect to FIG. 2 and/or to perform one or more operations discussed with respect to FIG. 3. For example, in some embodiments, text analysis manager 160 can perform operations 210 and 220, FIG. 2 as well as method 300, FIG. 3. In another example, in some embodiments, text modification manager 170 can perform operations 230-270, FIG. 2.

In some embodiments, the user device 110 can include a mobile phone, tablet, computer, and the like. The user device 110 can include a display 120 configured to present information such as images, symbols, and/or alphanumeric messages, such as text compositions. The user device 110 can include a user-input interface 125, such as a touchscreen, keyboard, and/or microphone, configured to allow a user to transmit text compositions and/or feedback to the automatic font selector 150.

In some embodiments, the server 190 can include a Web server configured to provide one or more software applications that can be employed by one or more user devices 110. In some embodiments, the network 180 can be a wide area network (WAN), a local area network (LAN), the Internet, or an intranet. In some embodiments, the network 180 can be substantially similar to, or the same as, cloud computing environment 50 discussed with respect to FIG. 6.

Figure 2:
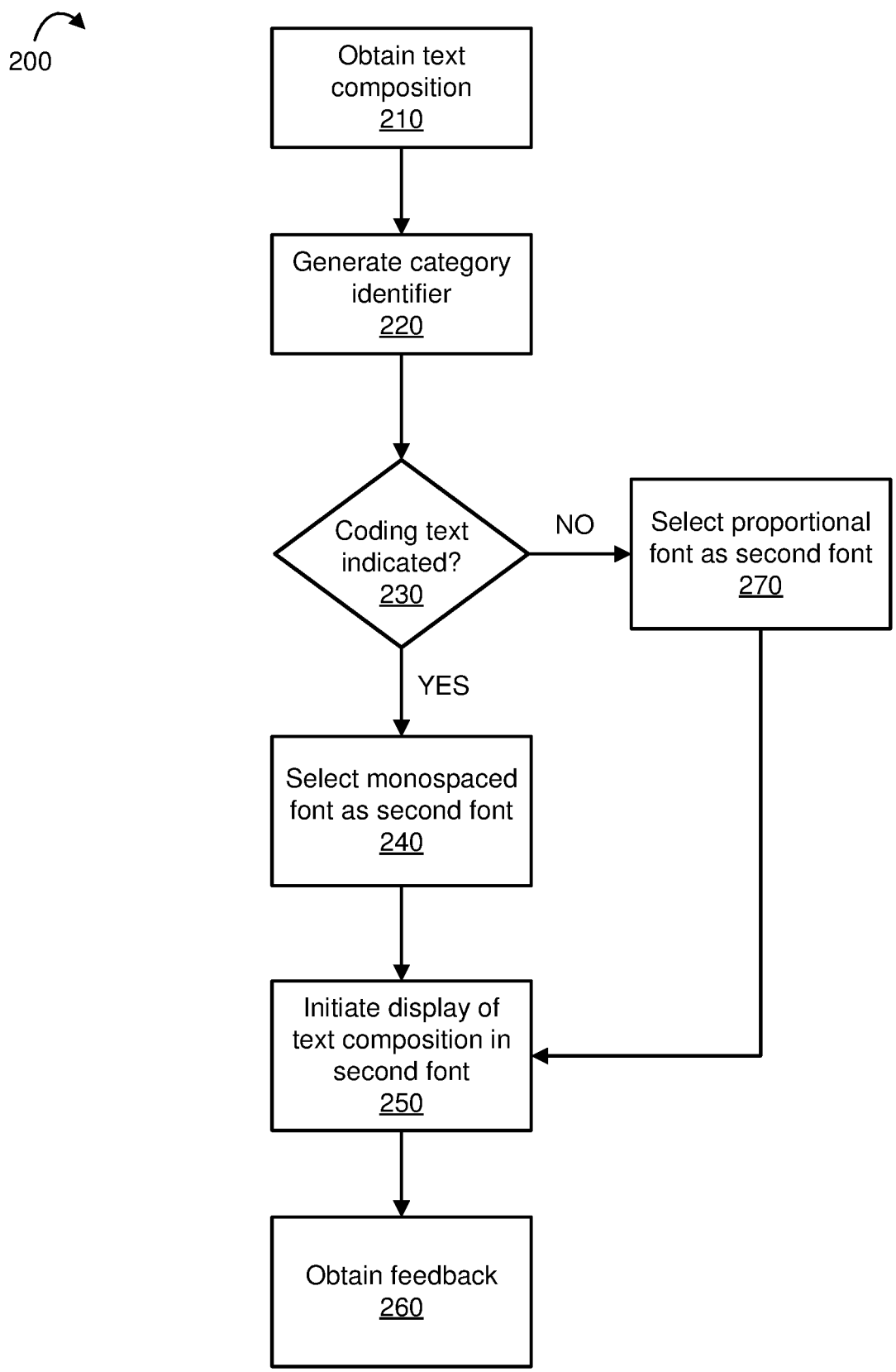
FIG. 2 depicts a flowchart of an example method for performing an automatic font selection, in accordance with embodiments of the present disclosure.

FIG. 2 illustrates a flowchart of an example method 200 for performing an automatic font selection, in accordance with embodiments of the present disclosure. The method 200 can be performed by an automatic font selector, such as the automatic font selector 150 described with respect to FIG. 1.

Referring back to FIG. 2, in operation 210, the automatic font selector can obtain a text composition. A text composition can include a set of characters, spaces, and/or symbols. For example, in some embodiments, a text composition can include a set of alphanumeric characters that includes words, sentences, programming commands, and/or data logs. In some embodiments, the text composition can be displayed on a user device in a first, original font, such as a proportional font.

In some embodiments, the automatic font selector can initiate method 200 in response to a command to electronically cut a text composition, electronically copy a text composition, and/or electronically paste a text composition. Such a command can be issued by a user. For example, in some embodiments, a user can draft lines of programming code using a text editor application of a computer. In this example, the user can transfer the lines of programming code to a window of a messaging application by electronically copying the lines of programming code from a window of the text editor application and then electronically pasting the lines of programming code into a window of the messaging application. In this example, the automatic font selector can obtain the lines of programming code in response to the command by the user to electronically paste the lines of programming code into the window of the messaging application.

In operation 220, in response to obtaining the text composition, the automatic font selector can generate a category identifier that corresponds to the text composition. A category identifier can indicate a category of a text composition. A category of a text composition can describe the content of the text composition. For example, in some embodiments, a category identifier can include a label, such as "coding text" or "non-coding text." In this example, "coding text" can be used to describe a text composition that primarily includes programming code (e.g., programming language commands) and/or data logs (e.g., event records that can include dates, timestamps, and/or event descriptions). Further in this example, "non-coding text" can be used to describe a text composition that does not primarily include programming code and/or data logs. For example, non-coding text can include a sentence or statement, such as, "I'm glad the server is running again." In some embodiments, the automatic font selector can generate a category identifier using method 300, discussed with respect to FIG. 3.

In operation 230, in response to obtaining the category identifier generated in operation 220, the automatic font selector can determine whether the category identifier matches a stored category identifier that indicates coding text. For example, in some embodiments, the automatic font selector can determine whether the category identifier matches a stored category identifier, "1," which is a representative numeric character that indicates coding text.

In operation 230, if the automatic font selector determines that coding text is indicated, then the automatic font selector can proceed to operation 240. If the automatic font selector determines that coding text is not indicated, then the automatic font selector can proceed to operation 270.

In operation 240, in response to determining that coding text is indicated in operation 230, the automatic font selector can select a monospaced font as a second font. A second font can refer to a font in which the text composition is to be displayed when the text composition is electronically pasted in accordance with the present disclosure. In some embodiments, selecting a monospaced font can include the automatic font selector storing a command to select a monospaced font.

In operation 270, in response to determining that coding text is not indicated in operation 230, the automatic font selector can select a proportional font as the second font. In some embodiments, selecting a proportional font can include the automatic font selector storing a command to select a proportional font.

In operation 250, in response to selecting a monospaced font or a proportional font as the second font in operation 240 or in operation 270, respectively, the automatic font selector can initiate a display of the text composition in the second font. In some embodiments, initiating a display of the text composition in the second font can include the automatic font selector transmitting a command to a text program, such as text program 140 described with respect to FIG. 1, to display the text composition in the second font. In response to the command, the text program can display the text composition in the second font when the text composition is electronically pasted into a window (e.g., a graphical user interface) of the text program.

In some embodiments, in operation 260, the automatic font selector can obtain feedback from a user. For example, in some embodiments, following the display of the text composition in the second font, the user can indicate to the automatic font selector whether the second font selected by the automatic font selector is the user's preferred font. In these embodiments, operation 260 can be used to provide reinforcement learning to the automatic font selector. For example, in some embodiments, the automatic font selector can employ the user feedback to adjust stored correlations between characteristics of a text composition and a category identifier. In some embodiments, such stored correlations can be included in a trained machine learning module used by the automatic font selector to analyze a text composition and/or generate a confidence value. Such a trained machine learning module can be included in the automatic font selector and implemented by a processor, such as processor 130 discussed with respect to FIG. 1. By obtaining feedback from a user in operation 260, the automatic font selector can improve the accuracy of its automatic font selections.

Figure 3:
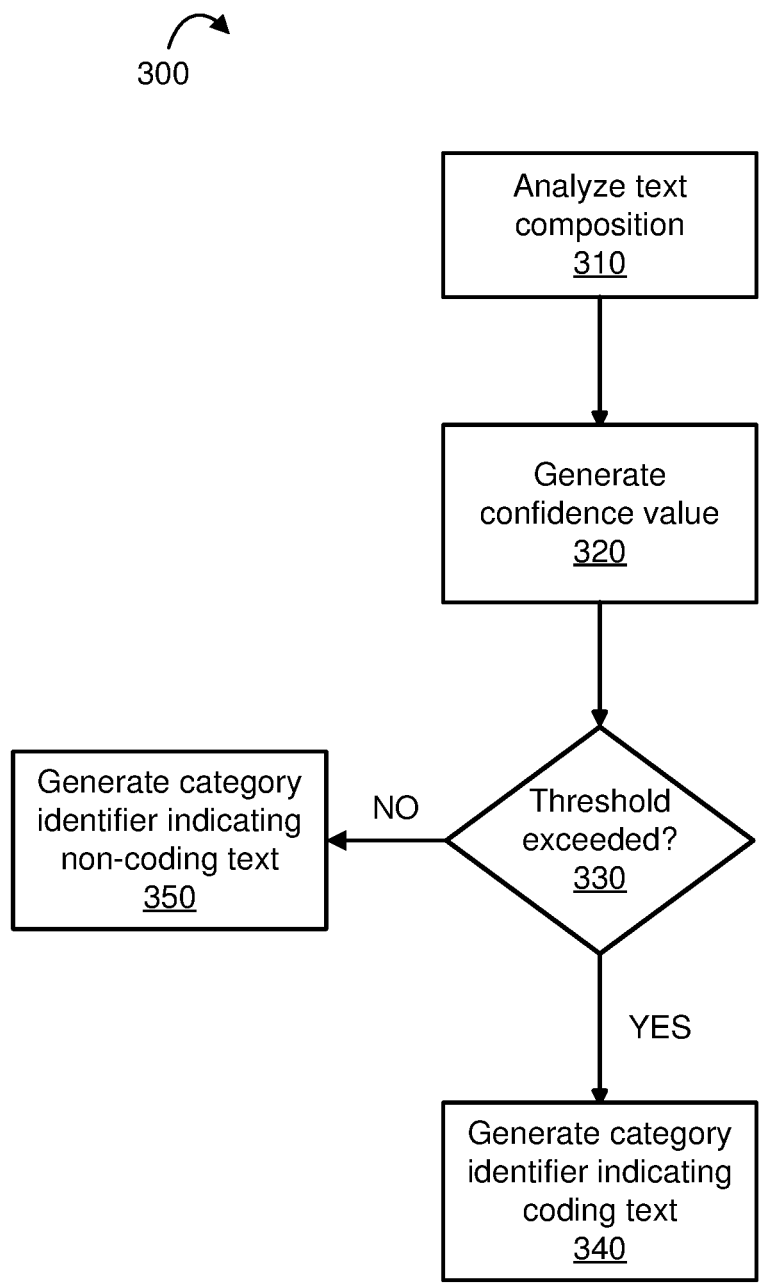
FIG. 3 depicts a flowchart of an example method for generating a category identifier, in accordance with embodiments of the present disclosure.

FIG. 3 depicts a flowchart of an example method 300 for generating a category identifier, in accordance with embodiments of the present disclosure. The method 300 can be performed by an automatic font selector, such as the automatic font selector 150 described with respect to FIG. 1.

Referring back to FIG. 3, in operation 310, the automatic font selector can analyze the content of a text composition. Analyzing the content of the text composition can include identifying and/or counting one or more characteristics of the text composition. For example, in some embodiments, such analyzing can include performing one or more operations, such as counting a quantity of characters in a text composition; identifying and/or counting programming language command terms; identifying and/or counting whether letters are present in uppercase or lowercase; identifying and/or counting a quantity of letters, numbers, and/or symbols; and identifying and/or counting a quantity of rows and/or columns in the text composition. In some embodiments, analyzing the content of the text composition can include identifying and/or counting patterns in the text composition. For example, in some embodiments such analyzing can include operations, such as counting a number of instances in which characters and/or symbols are adjacent (e.g., when a letter is adjacent to a number, when a number is adjacent to a colon, and the like) and identifying when particular characters or sets of characters are present in multiple rows and/or columns of the text composition. In some embodiments, operation 310 can include the automatic font selector implementing natural language processing technology to identify characteristics such as the presence of words that can be found in a speaking language dictionary and/or the presence of grammatical structure in a text composition.

A first example of analyzing the content of a text composition is discussed below with respect to TABLE 1.

TABLE 1

| 1 | say isfulog.0 |
| 2 | do i = 5 to isfulog.0 |
| 3 | say isfulog.i |
| 4 | end |

TABLE 1 shows a text composition that includes four rows of programming code. In this example, operation 310 can include the automatic font selector counting the number of characters in each of the 4 rows. This example can further include the automatic font selector identifying a term, such as "isfulog," as a coding term by comparing the term to a set of coding terms stored in a memory of a computer system accessible by the automatic font selector.

A second example of analyzing the content of a text composition is discussed below with respect to TABLE 2.

TABLE 2

|   | 1 | 2 |
|---|---|---|
| 1 | 16:46:09 | GEO015I |
| 2 | 16:46:13 | GEO015I |
| 3 | 16:46:11 | GEO01MM |
| 4 | 16:46:14 | GEO015I |

TABLE 2 shows a text composition that includes four rows and two columns of a system log. In this example, operation 310 can include the automatic font selector identifying patterns, such as each row of the first column having a number-colon-number sequence. This example can further include the automatic font selector counting the instances of letters appearing adjacent to numbers in the second column. This example can further include the automatic font selector identifying that all of the letters appearing in the text composition are capitalized.

Operation 310 can further include the automatic font selector determining whether one or more identified characteristics and/or patterns of the text composition match one or more stored characteristics and/or patterns. The stored characteristics and/or patterns can represent characteristics and/or patterns that can be indicative of coding text. In some embodiments, the stored characteristics and/or patterns can be included in a memory of a computer system accessible by the automatic font selector.

In operation 320, the automatic font selector can generate a confidence value based on the analysis performed in operation 310. A confidence value can indicate a degree of certainty that a text composition primarily includes coding text. In some embodiments, a confidence value can include a numerical value. In some embodiments, a higher confidence value can indicate a greater degree of certainty that a text composition primarily includes coding text.

In operation 320, generating a confidence value can include correlating a numerical value to results of the analysis performed in operation 310. For example, in some embodiments, the automatic font selector can increase an initial confidence value (e.g., 0) by an incremental value (e.g., 1) for each identified characteristic and/or pattern that matches a stored characteristic and/or pattern. For example, referring back to the example discussed with respect to TABLE 2, each of the three identified characteristics (i.e., the number-colon-number pattern, the number of instances of letters appearing adjacent to numbers, and all of the letters being capitalized) can match a stored characteristic and be indicative of coding text. Accordingly, in this example, the automatic font selector can increase an initial confidence value of 0 by 1 point for each of the identified characteristics. Thus, in this example, the automatic font selector can generate a confidence value of 3.

In operation 330, the automatic font selector can compare the confidence value generated in operation 320 to a predetermined threshold and determine whether the threshold is exceeded. In some embodiments, the threshold can be selected by an entity, such as a user or a programmer of the automatic font selector. In some embodiments, the threshold can be selected and/or modified by the automatic font selector in response to feedback the automatic font selector obtains from a user. In operation 330, if the automatic font selector determines that the threshold is exceeded, then the automatic font selector can proceed to operation 340. If the automatic font selector determines that the threshold is not exceeded, then the automatic font selector can proceed to operation 350.

In operation 340, the automatic font selector can generate a category identifier that corresponds to the text composition and indicates coding text. In operation 350, the automatic font selector can generate a category identifier that corresponds to the text composition and indicates non-coding text. In some embodiments, the category identifier can include a descriptive label and/or a representative symbol or character, such as a "1" or "0."

Figure 4:
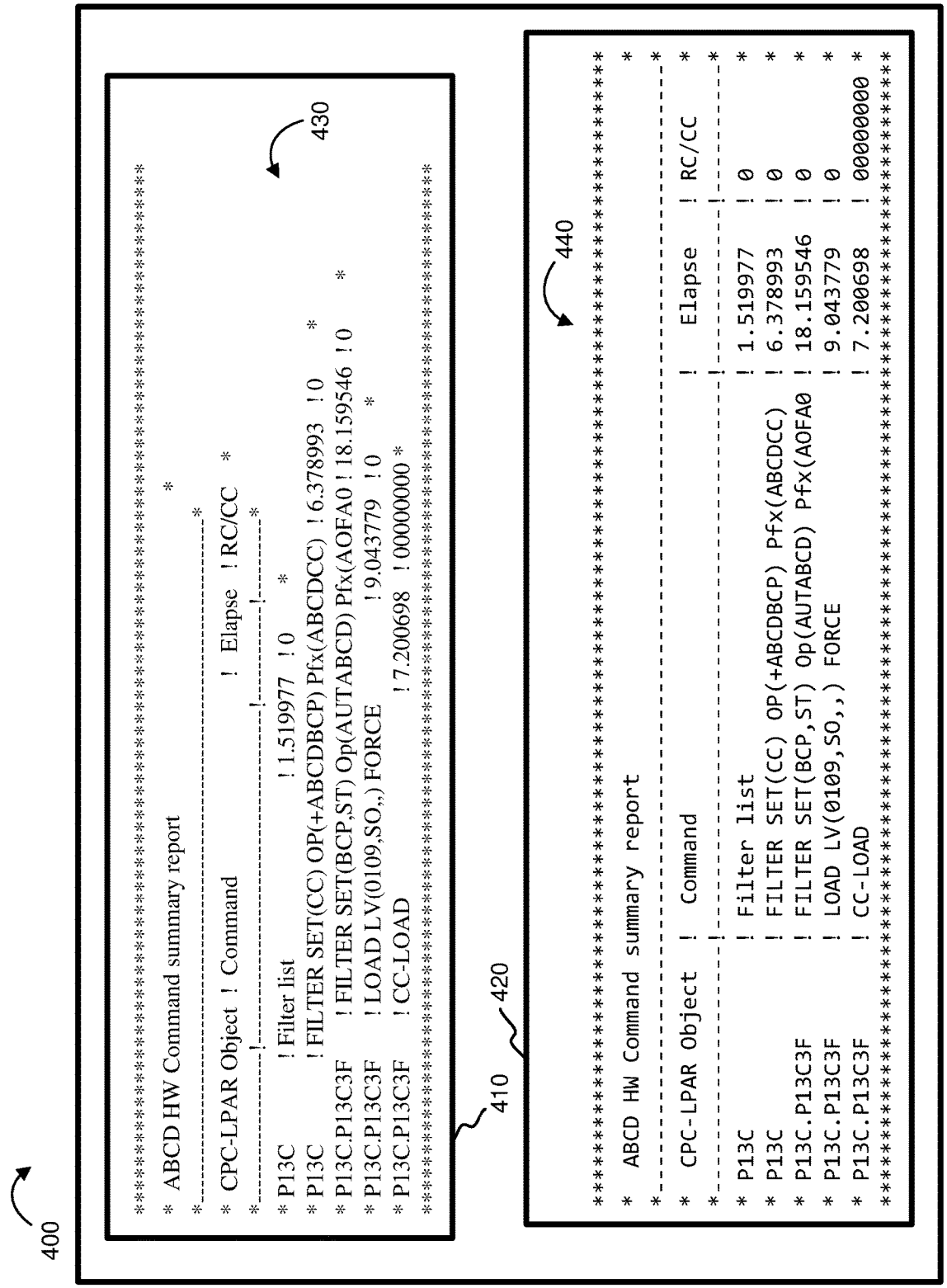
FIG. 4 depicts an example display, in accordance with embodiments of the present disclosure.

FIG. 4 depicts an example display 400 of a user device in accordance with embodiments of the present disclosure. The display 400 includes a first window 410 and a second window 420. Each window corresponds to a graphical user interface of a discrete text program, such as the text program 140 described with respect to FIG. 1. In this example, first window 410 corresponds to a word processing application, and second window 420 corresponds to a messaging application. First window 410 includes a first display 430 of a text composition (i.e., a data log) having a first font (i.e., a proportional font). Second window 420 includes a second display 440 of the text composition having a second font (i.e., a monospaced font). The second display 440 results from a user electronically pasting the text composition from the first window 410 to the second window 420, in accordance with embodiments of the present disclosure.

Particularly, in this example, an automatic font selector, installed on a computer system of the user device, obtained the text composition when the user input a command to paste the text composition copied from the first window 410. In response to obtaining the text composition, the automatic font selector analyzed the text composition. In response to the analysis, the automatic font selector generated a confidence value that exceeded a threshold; thus, the automatic font selector generated a category identifier indicating coding text. In response to generating the category identifier indicating coding text, the automatic font selector selected a monospaced font as the second font. In response to selecting a monospaced font as the second font, the automatic font selector transmitted a command to the messaging application to display the text composition in the second font. In response to the command, the messaging application generated the second display 440 of the text composition having the second, monospaced font. As depicted in FIG. 4, the consistent alignment of the monospaced font in the second window 420 can provide clearer formatting and readability of the data log, compared to the formatting and readability provided by the proportional font in the first window 410.

Figure 5:
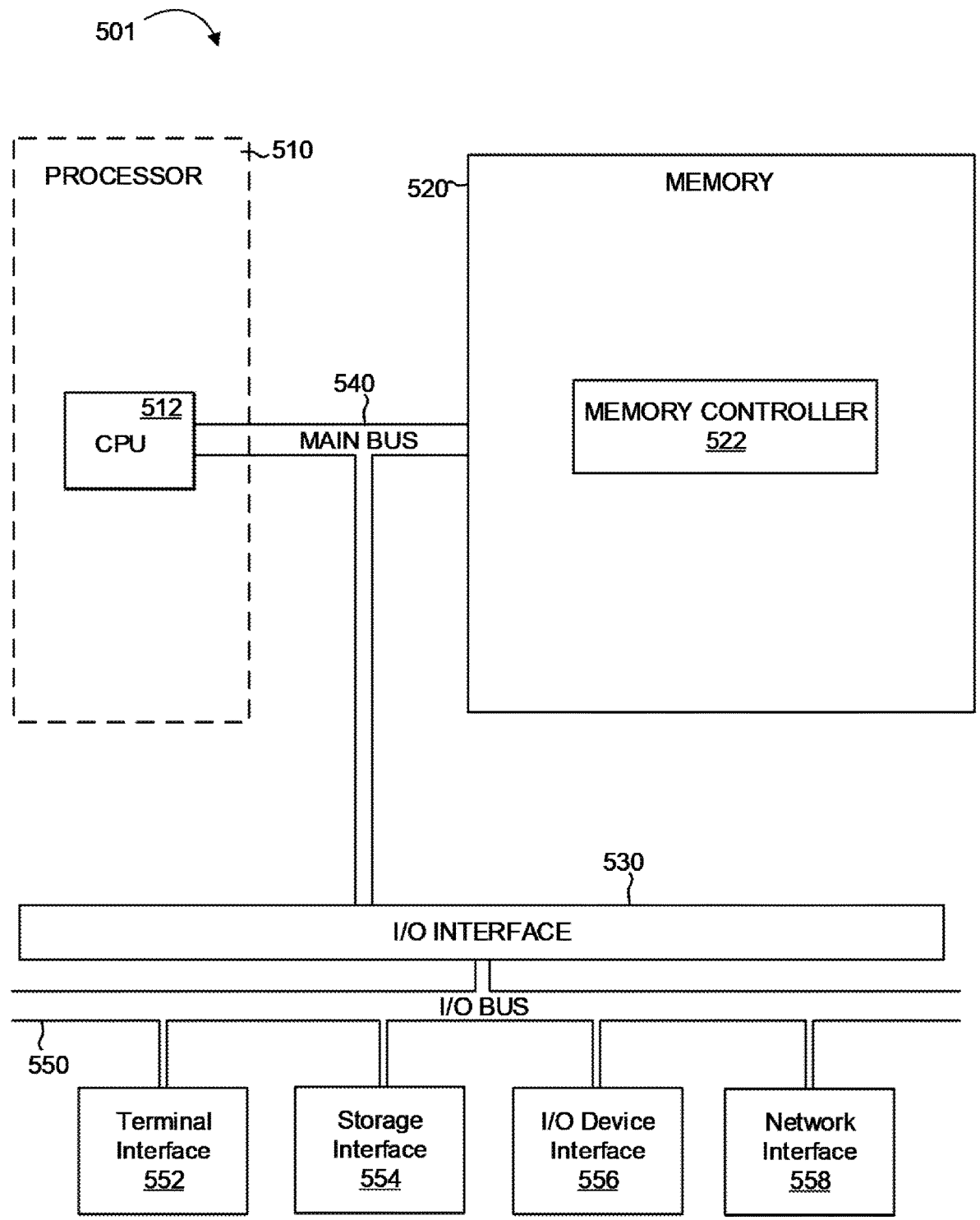
FIG. 5 depicts the representative major components of a computer system that can be used in accordance with embodiments of the present disclosure.

FIG. 5 depicts the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or non-volatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501— including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
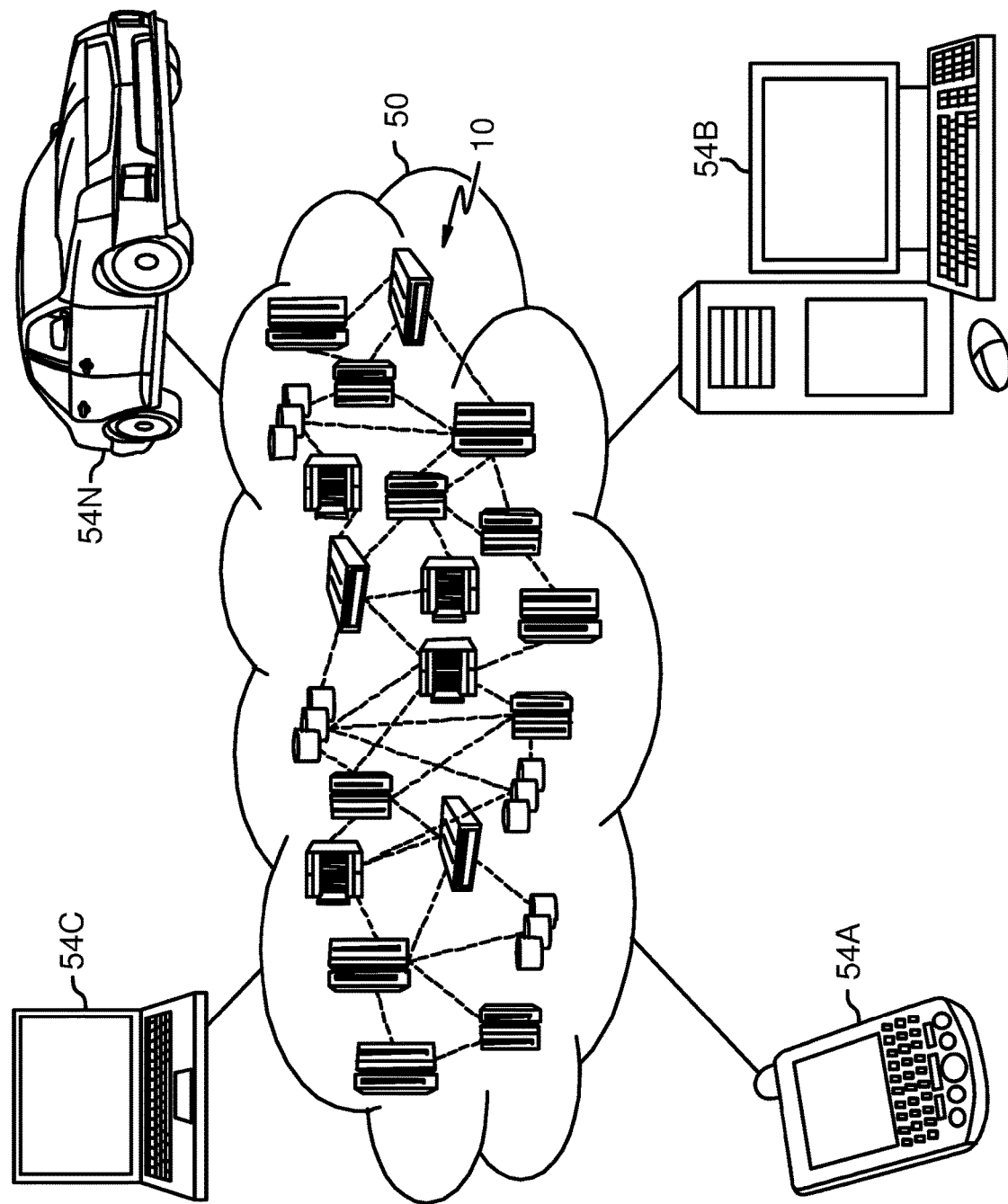
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
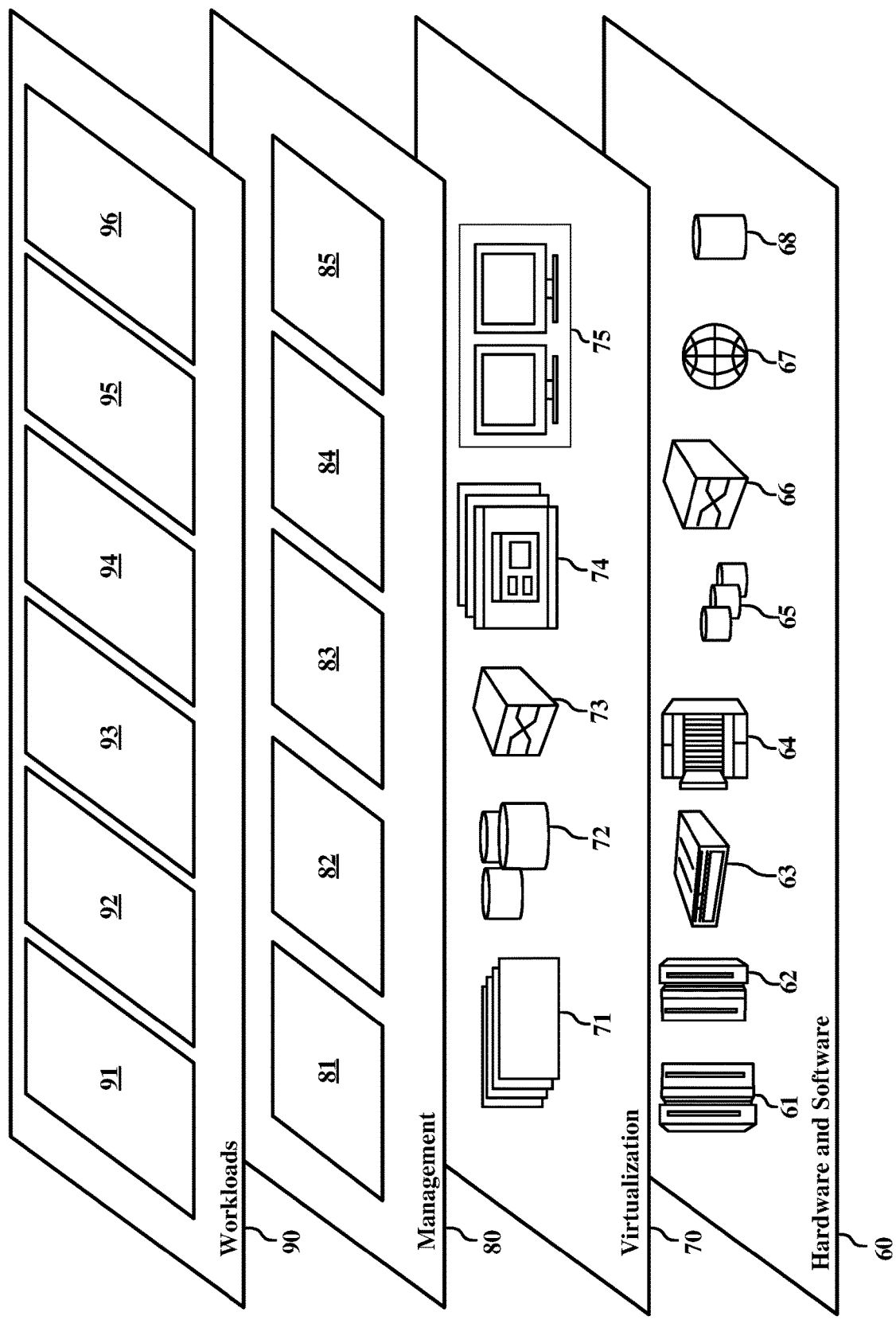
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and automatic font selection logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining a text composition having a proportional font;
determining that the text composition comprises coding text using a machine learning algorithm, wherein the determining comprises identifying a quantity of rows in the text composition, identifying coding text characteristics within the rows, and generating a confidence value that the text composition comprises coding text;
automatically selecting, in response to the determining, a monospaced font for the text composition;
transmitting, in response to the automatically selecting the monospaced font, a command to a text program to display the text composition in the monospaced font, wherein at least the generating, determining, the automatically selecting, and the transmitting are performed without user input; and
adjusting stored correlations between characteristics of the text composition and a category identifier indicating a category of the text composition, wherein the adjusting is based on feedback of the display of the text composition in the monospaced font, and wherein the stored correlations are included in the machine learning model.

2. The computer-implemented method of claim 1, wherein the obtaining the text composition occurs in response to an initial command, wherein the initial command is selected from a group consisting of: electronically cutting the text composition, electronically copying the text composition, and electronically pasting the text composition.

3. The computer-implemented method of claim 1, wherein the determining that the text composition comprises coding text comprises:
analyzing the text composition and generating the confidence value based on the analyzing;
comparing the confidence value to a threshold;
determining that the confidence value exceeds the threshold; and
generating the category identifier based on the determining that the confidence value exceeds the threshold, the category identifier indicating the coding text.

4. The computer-implemented method of claim 3, wherein the analyzing the text composition comprises identifying one or more characteristics of the text composition, wherein the one or more characteristics of the text composition includes the quantity of rows in the text composition.

5. The computer-implemented method of claim 4, wherein the analyzing the text composition further comprises counting a number of columns in the text composition.

6. The computer-implemented method of claim 1, wherein the coding text is selected from a group consisting of: programming language commands and data logs.

7. A system comprising:
a processor; and
a memory in communication with the processor, the memory containing program instructions that, when executed by the processor, are configured to cause the processor to perform a method, the method comprising:

obtaining a text composition having a proportional font;
determining that the text composition comprises coding text using a machine learning algorithm, wherein the determining comprises identifying a quantity of rows in the text composition, identifying coding text characteristics within the rows, and generating a confidence value that the text composition comprises coding text;
automatically selecting, in response to the determining, a monospaced font for the text composition;
transmitting, in response to the automatically selecting the monospaced font, a command to a text program to display the text composition in the monospaced font,
wherein at least the generating, determining, the automatically selecting, and the transmitting are performed without user input; and
adjusting stored correlations between characteristics of the text composition and a category identifier indicating a category of the text composition, wherein the adjusting is based on feedback of the display of the text composition in the monospaced font, and wherein the stored correlations are included in the machine learning model.

8. The system of claim 7, wherein the obtaining the text composition occurs in response to an initial command, wherein the initial command is selected from a group consisting of: electronically cutting the text composition, electronically copying the text composition, and electronically pasting the text composition.

9. The system of claim 7, wherein the determining that the text composition comprises coding text comprises:
analyzing the text composition and generating the confidence value based on the analyzing;
comparing the confidence value to a threshold;
determining that the confidence value exceeds the threshold; and
generating the category identifier based on the determining that the confidence value exceeds the threshold, the category identifier indicating the coding text.

10. The system of claim 9, wherein the analyzing the text composition comprises identifying one or more characteristics of the text composition, wherein the one or more characteristics of the text composition includes the quantity of rows in the text composition.

11. The system of claim 10, wherein the analyzing the text composition further comprises counting a number of columns in the text composition.

12. The system of claim 7, wherein the coding text is selected from a group consisting of: programming language commands and data logs.

13. A computer program product comprising a computer readable storage medium having program instructions embodied therewith, the program instructions executable by a processor to cause the processor to perform a method, the method comprising:
obtaining a text composition having a proportional font;
determining that the text composition comprises coding text using a machine learning algorithm, wherein the determining comprises identifying a quantity of columns in the text composition, identifying coding text characteristics within the rows, and generating a confidence value that the text composition comprises coding text;
automatically selecting, in response to the determining, a monospaced font for the text composition;
transmitting, in response to the automatically selecting the monospaced font, a command to display the text composition in the monospaced font,
wherein at least the generating, determining, the automatically selecting, and the transmitting are performed without user input; and
adjusting stored correlations between characteristics of the text composition and a category identifier indicating a category of the text composition, wherein the adjusting is based on feedback of the display of the text composition in the monospaced font, and wherein the stored correlations are included in the machine learning model.

14. The computer program product of claim 13, wherein the obtaining the text composition occurs in response to an initial command, wherein the initial command is selected from a group consisting of: electronically cutting the text composition, electronically copying the text composition, and electronically pasting the text composition.

15. The computer program product of claim 13, wherein the determining that the text composition comprises coding text comprises:
analyzing the text composition and generating the confidence value based on the analyzing;
comparing the confidence value to a threshold;
determining that the confidence value exceeds the threshold; and
generating the category identifier based on the determining that the confidence value exceeds the threshold, the category identifier indicating the coding text.

16. The computer program product of claim 15, wherein the analyzing the text composition comprises identifying one or more characteristics of the text composition, wherein the one or more characteristics of the text composition includes the quantity of columns in the text composition.

17. The computer program product of claim 16, wherein the analyzing the text composition further comprises counting a number of rows in the text composition.

18. The computer program product of claim 13, wherein the coding text is selected from a group consisting of: programming language commands and data logs.

* * * * *